United States Patent
Kotani et al.

(10) Patent No.: US 8,658,738 B2
(45) Date of Patent: Feb. 25, 2014

(54) CURABLE RESIN COMPOSITION

(75) Inventors: Jun Kotani, Settsu (JP); Nobuyuki Kobayashi, Hiratsuka (JP); Hiroyuki Hosoda, Hiratsuka (JP); Kazunori Ishikawa, Hiratsuka (JP)

(73) Assignee: Kaneka Corporation, Osaka (JP)

( * ) Notice: Subject to any disclaimer, the term of this patent is extended or adjusted under 35 U.S.C. 154(b) by 252 days.

(21) Appl. No.: 13/377,694

(22) PCT Filed: Jun. 24, 2009

(86) PCT No.: PCT/JP2009/061451
§ 371 (c)(1),
(2), (4) Date: Dec. 12, 2011

(87) PCT Pub. No.: WO2010/150361
PCT Pub. Date: Dec. 29, 2010

(65) Prior Publication Data
US 2012/0088859 A1    Apr. 12, 2012

(51) Int. Cl.
| | | |
|---|---|---|
| C08L 83/07 | (2006.01) | |
| C08L 83/08 | (2006.01) | |
| C08L 83/00 | (2006.01) | |
| C08J 3/28 | (2006.01) | |
| C08K 3/24 | (2006.01) | |

(52) U.S. Cl.
USPC ............. 525/102; 522/99; 522/148; 522/172; 522/173; 522/181; 525/50; 525/55; 525/57; 525/100; 525/106; 528/10; 528/12; 528/21; 528/22; 528/32; 528/38; 528/41

(58) Field of Classification Search
USPC .......... 528/10, 12, 21, 22, 32, 38, 41; 525/50, 525/55, 57, 58, 100, 102, 106; 522/99, 148, 522/172, 173, 178, 181
See application file for complete search history.

(56) References Cited

U.S. PATENT DOCUMENTS

| | | |
|---|---|---|
| 4,837,401 A | 6/1989 | Hirose et al. |
| 5,986,014 A | 11/1999 | Kusakabe et al. |
| 6,420,492 B1 | 7/2002 | Kusakabe et al. |
| 6,441,101 B1 | 8/2002 | Kusakabe et al. |
| 2002/0177670 A1 | 11/2002 | Kusakabe et al. |
| 2003/0105261 A1 | 6/2003 | Komitsu et al. |
| 2009/0292075 A1 | 11/2009 | Tamai et al. |
| 2010/0105798 A1 | 4/2010 | Hasegawa |

FOREIGN PATENT DOCUMENTS

| | | |
|---|---|---|
| JP | 61-141761 A | 6/1986 |
| JP | 62-035421 B2 | 8/1987 |
| JP | 1-058219 B2 | 12/1989 |
| JP | 9-272714 A | 10/1997 |
| JP | 11-043512 A | 2/1999 |
| JP | 2004-059870 A | 2/2004 |
| JP | 2004-083606 A | 3/2004 |
| JP | 2004315702 A * | 11/2004 |
| JP | 2005-290244 A | 10/2005 |
| JP | 2005272774 A * | 10/2005 |
| WO | 2007/069600 A1 | 6/2007 |
| WO | 2008/041768 A1 | 4/2008 |

OTHER PUBLICATIONS

Notification of Transmittal of Translation of the International Preliminary Report on Patentability (Form PCT/IB/338) of International Application No. PCT/JP2009/061451 mailed Jan. 26, 2012 with Forms PCT/IB/373 and PCT/ISA/237.
International Search Report of PCT/JP2009/061451, mailing date Oct. 20, 2009.

* cited by examiner

*Primary Examiner* — Sanza McClendon
(74) *Attorney, Agent, or Firm* — Westerman, Hattori, Daniels & Adrian, LLP

(57) ABSTRACT

A curable resin composition, comprising 100 parts by mass of a (meth)acrylic polymer (A) having, at a terminal thereof, at least one crosslinkable silyl group; 0.1 to 100 parts by mass of a diamine compound (B) having a monovalent or bivalent aliphatic or alicyclic hydrocarbon group that has 8 or more carbon atoms and may be branched and having at least one primary amino group; and 0.1 to 100 parts by mass of a diamine compound (C) having a monovalent aliphatic or alicyclic hydrocarbon group that has 8 or more carbon atoms and may be branched, and having a crosslinkable silyl group and/or a (meth)acryloyl group.

12 Claims, No Drawings

CURABLE RESIN COMPOSITION

TECHNICAL FIELD

The present invention relates to a curable resin composition using a (meth)acrylic polymer having a crosslinkable silyl group.

BACKGROUND ART

As a one-component type moisture-curable resin composition, the so-called modified silicone curable resin composition is known.

In this modified silicone type moisture-curable resin composition, a modified silicone polymer is used (see, for example, Patent Documents 1 to 5).

This modified silicone polymer is a polymer having, as a main chain, a polyether or a compound of an acrylic type, which also denotes a methacrylic type (the same matter is applied to the following description), and having a crosslinking silyl group, which is crosslinkable. A curing catalyst is used to make the polymer into a one-component type composition, which is stable for a long term in the state that the polymer is sealed up but is rapidly cured when exposed to humidity, so as to be turned to a rubbery material.

The modified silicone type moisture-curable resin composition is usable as a sealant. A modified silicone sealant, wherein a modified silicone polymer is used as a sealant, is better in storage stability, weather resistance, anti-foaming property, and discoloration resistance than polyurethane type sealants. The sealant is better in curability and smaller in toxicity, and less elutes or flows out to the surroundings about its sealant component than polysulfide sealants. Moreover, the sealant less elutes or flows out to the surroundings about its sealant component, and is better in paintability onto surfaces than ordinary silicone type sealants.

However, as for conventional modified silicone sealants, their surfaces have surface tackiness after the sealants are cured. When the sealants are each used as an outside wall material or the like, there is caused a problem about stain that sand or some other adheres easily thereto.

In order to solve such problems, the Applicant suggests, in Patent Document 6, a "curable resin composition comprising 100 parts by weight of a crosslinkable-silyl-group-containing organic polymer (A) and 0.1 to 10 parts by weight of a diamine compound (B) represented by the following formula (1):

$$R^1—NH—R^2—NH_2 \qquad (1)$$

wherein $R^1$ is a monovalent aliphatic hydrocarbon group that has 12 to 21 carbon atoms and may be branched, and $R^2$ is an alkylene group that has 2 to 4 carbon atoms and may be branched.

CITATION LIST

Patent Documents

Patent Document 1: JP-B-62-35421
Patent Document 2: JP-A-61-141761
Patent Document 3: JP-B-1-58219
Patent Document 4: JP-A-9-272714
Patent Document 5: JP-A-11-43512
Patent Document 6: JP-A-2004-59870

SUMMARY OF THE INVENTION

Technical Problems

However, the inventors have made investigations about the curable resin composition described in Patent Document 6 to find out that when the composition is used as a sealing material, it is difficult that the composition keeps a high stain resistance over a long term from an initial stage just after a process in which the sealing material is applied.

Thus, an object of the present invention is to provide a curable resin composition that has basic properties for sealing material, such as weather resistance and bonding performance, has no surface tackiness after cured, and can further keep a high stain resistance over a long term from an initial stage just after a process in which the composition is applied.

Solution to Problems

In order to solve the problems, the inventors have made eager investigations to find out that that a curable resin composition which contains a (meth)acrylic polymer having, at a terminal thereof, a crosslinkable silyl group, a specific amine compound, and a specific compound having a crosslinkable silyl group and/or a (meth)acryloyl group, the amounts of these compounds being each a specific amount, has basic properties for sealing material, such as weather resistance and bonding performance, has no surface tackiness after cured, and can further keep a high stain resistance over a long term from an initial stage just after a process in which the composition is applied.

Accordingly, the present invention provides the following (1) to (12):

(1) A curable resin composition, comprising 100 parts by mass of a (meth)acrylic polymer (A) having, at a terminal thereof, at least one crosslinkable silyl group; 0.1 to 100 parts by mass of a diamine compound (B) having a monovalent or bivalent aliphatic or alicyclic hydrocarbon group that has 8 or more carbon atoms and may be branched and having at least one primary amino group; and 0.1 to 100 parts by mass of a diamine compound (C) having a monovalent aliphatic or alicyclic hydrocarbon group that has 8 or more carbon atoms and may be branched, and having a crosslinkable silyl group and/or a (meth)acryloyl group.

(2) The curable resin composition according to (1), wherein the diamine compound (C) is a reaction product (C1) made from a diamine compound (c11) represented by the following formula (I), an epoxysilane (c12), and a (meth)acryloyl-group-containing compound (c13):

$$R^1—NH—R^2—NH_2 \qquad (I)$$

wherein $R^1$ represents a monovalent aliphatic or alicyclic hydrocarbon group that has 8 or more carbon atoms and may be branched, and $R^2$ represents a bivalent hydrocarbon group that has 2 to 18 carbon atoms, may have an oxygen atom, and may be branched.

(3) The curable resin composition according to (2), wherein the ratio by mole of the diamine compound (c11) to the epoxysilane (c12) to the (meth)acryloyl-group-containing compound (c13), i.e., the ratio by mole of (c11)/(c12)/(c13), these compounds being used in the reaction product (C1), is from 1/0.1-3.0/0.1-3.0.

(4) The curable resin composition according to (2) or (3), wherein the (meth)acryloyl-group-containing compound (c13) has a saturated hydrocarbon group.

(5) The curable resin composition according to (2) or (3), wherein the (meth)acryloyl-group-containing compound (c13) has an unsaturated hydrocarbon group.

The curable resin composition according to (2) or (3), wherein the (meth)acryloyl-group-containing compound (c13) has a cyclic structure.

(7) The curable resin composition according to (1), wherein the diamine compound (C) is a diamine compound (C2) represented by the following formula (II):

$$R^1\text{—}NR^3\text{—}R^2\text{—}NR^4R^5 \quad (II)$$

wherein $R^1$ represents a monovalent aliphatic or alicyclic hydrocarbon group that has 8 or more carbon atoms and may be branched; $R^2$ represents a bivalent hydrocarbon group that has 2 to 18 carbon atoms, may have an oxygen atom, and may be branched; and $R^3$, $R^4$ and $R^5$ each independently represent a hydrogen atom, or an organic group that has 2 to 30 carbon atoms and may contain a (meth)acryloyl group provided that at least one of $R^3$, $R^4$ and $R^5$ represents a group containing a (meth)acryloyl group.

(8) The curable resin composition according to (7), wherein the diamine compound (C2) is a reaction product made from a diamine compound (c21) represented by the following formula (I), and a compound (c22) having, in a single molecule thereof, two or more (meth)acryloyl groups:

$$R^1\text{—}NH\text{—}R^2\text{—}NH_2 \quad (I)$$

wherein $R^1$ represents a monovalent aliphatic or alicyclic hydrocarbon group that has 8 or more carbon atoms and may be branched, and $R^2$ represents a bivalent hydrocarbon group that has 2 to 18 carbon atoms, may have an oxygen atom, and may be branched.

(9) The curable resin composition according (7), wherein the diamine compound (C2) is a reaction product made from a diamine compound (c21) represented by the following formula (I), and a compound (c23) having, in a single molecule thereof, one or more (meth)acryloyl groups, and one or more epoxy groups:

$$R^1\text{—}NH\text{—}R^2\text{—}NH_2 \quad (I)$$

wherein $R^1$ represents a monovalent aliphatic or alicyclic hydrocarbon group that has 8 or more carbon atoms and may be branched, and $R^2$ represents a bivalent hydrocarbon group that has 2 to 18 carbon atoms, may have an oxygen atom, and may be branched.

(10) The curable resin composition according to any one of (7) to (9), wherein the diamine compound (C2) contains a crosslinkable silyl group.

(11) The curable resin composition according to any one of (1) to (10), further comprising a photopolymerization initiator (D).

(12) The curable resin composition according to (11), wherein the photopolymerization initiator (D) is a radical photoinitiator.

Advantageous Effects

As described below, according to the present invention, a curable resin composition can be provided which has basic properties for sealing material, such as weather resistance and bonding performance, has no surface tackiness after cured, and can further keep a high stain resistance over a long term from an initial stage just after a process in which the composition is applied.

EMBODIMENTS FOR CARRYING OUT THE INVENTION

Hereinafter, the present invention will be described in more detail.

The curable resin composition of the present invention, which may be referred to as the composition of the present invention hereinafter, is a curable resin composition comprising 100 parts by mass of a (meth)acrylic polymer (A) having, at a terminal thereof, at least one crosslinkable silyl group; 0.1 to 100 parts by mass of a diamine compound (B) having a monovalent or bivalent aliphatic or alicyclic hydrocarbon group that has 8 or more carbon atoms and may be branched and having at least one primary amino group; and 0.1 to 100 parts by mass of a diamine compound (C) having a monovalent aliphatic or alicyclic hydrocarbon group that has 8 or more carbon atoms and may be branched, and having a crosslinkable silyl group and/or a (meth)acryloyl group.

It is preferred that the composition of the present invention further contains a photopolymerization initiator (D) in order to make the high stain resistance thereof better.

Hereinafter, a detailed description will be made about the (meth)acrylic polymer (A), the diamine compound (B), and the diamine compound (C), which are contained in the composition of the present invention, and the photopolymerization initiator (D), which is contained therein if desired.

<(Meth)Acrylic Polymer (A)>

The (meth)acrylic polymer (A) is a polymer having, at a terminal thereof, at least one crosslinkable group illustrated below, and containing, in a main chain thereof, alkyl acrylate monomer units and/or alkyl methacrylate monomer units.

The crosslinkable silyl group denotes a group that undergoes a condensation reaction in the presence of humidity or a crosslinking agent by an optional use of a catalyst or some other, such as a silicon-containing group having a hydrolyzable group bonded to a silicon atom, and a silanol group. A typical example thereof is a group represented by the following general formula (1):

[Formula 1]

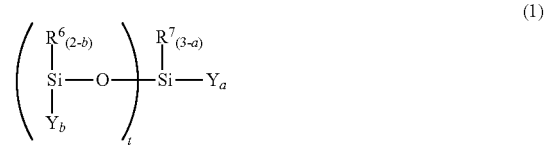

In the formula, $R^6(s)$, as well as $R^7(s)$, (each) represent(s) an alkyl group having 1 to 20 carbon atoms, an aryl group having 6 to 20 carbon atoms, an aralkyl group having 7 to 20 carbon atoms, or a triorganosiloxy group represented by $(R^8)_3SiO\text{—}$, and $R^6(s)$ is/are (each) independently of $R^7(s)$ provided that when two or more $R^6$s or $R^7$s are present, they may be the same or different.

$R^8$s are each a monovalent hydrocarbon group having 1 or 20 carbon atoms, and three $R^8$s may be the same or different. $Y(s)$ (each) represent(s) a hydroxyl group or a hydrolyzable group provided that when two or more Ys are present, Ys may be the same or different, and a represents 0, 1, 2 or 3, and b represents 0, 1 or 2.

In the groups each represented by the following general formula (2), the number of the groups being t, b's may be different from each other, and t represents an integer of 0 to 19 provided that the following is satisfied: $a+t\times b\geq 1$.

[Formula 2]

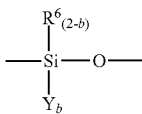

(2)

The hydrolyzable group(s) represented by Y(s) is/are not particularly limited, and may (each) be a hydrolyzable group known in the prior art. Specific preferred examples thereof include hydrogen and halogen atoms; and alkoxy, acyloxy, ketoxymate, amino, amide, acid amide, aminoxy, mercapto, and alkenyloxy groups. Of these examples, preferred are a hydrogen atom, and alkoxy, acyloxy, ketoxymate, amino, amide, aminoxy, mercapto, and alkenyloxy groups. Alkoxy groups, such as a methoxy group, are particularly preferred since the groups are mild in hydrolyzability to be easily handled.

Out of crosslinkable silyl groups, a crosslinkable silyl group represented by the following general formula (3) is preferred from the viewpoint of the availability (of the (meth) acrylic polymer (A)). In the formula (3), $R^7(s)$, Y(s), and the symbol "a" have the same meanings as the above-mentioned $R^7(s)$, Y(s), and the symbol "a", respectively.

[Formula 3]

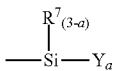

(3)

Specific examples of $R^6(s)$ and $R^7(s)$ in the formula (1) include alkyl groups such as methyl, ethyl groups and the like; alicyclic hydrocarbon groups such as a cyclohexyl group and the like; aryl groups such as a phenyl group and the like; aralkyl groups such as a benzyl group and the like; and triorganosiloxy groups represented by $(R^8)_3SiO$— wherein $R^8$ is a methyl, phenyl or the like. $R^6(s)$, $R^7(s)$, and $R^8$s are each in particular preferably a methyl group.

In the meantime, the alkyl acrylate units, which form the main chain of the (meth)acrylic polymer (A), include methyl acrylate, ethyl acrylate, propyl acrylate, isopropyl acrylate, n-butyl acrylate, isobutyl acrylate, tert-butyl acrylate, n-pentyl acrylate, n-hexyl acrylate, cyclohexyl acrylate, n-heptyl acrylate, n-octyl acrylate, 2-ethylhexyl acrylate, nonyl acrylate, decyl acrylate, undecyl acrylate, dodecyl acrylate, lauryl acrylate, tridecyl acrylate, myristyl acrylate, cetyl acrylate, stearyl acrylate, behenyl acrylate, phenyl acrylate, toluoyl acrylate, benzyl acrylate, biphenyl acrylate, 2-methoxyethyl acrylate, 3-methoxybutyl acrylate, 2-hydroxyethyl acrylate, 2-hydroxypropyl acrylate, glycidyl acrylate, 2-aminoethyl acrylate, trifluoromethylmethyl acrylate, 2-trifluoromethylethyl acrylate, 2-perfluoroethylethyl acrylate, 2-perfluoroethyl-2-perfluorobutylethyl acrylate, perfluoroethyl acrylate, perfluoromethyl acrylate, diperfluoromethylmethyl acrylate, 2-perfluoromethyl-2-perfluoroethylethyl acrylate, 2-perfluorohexylethyl acrylate, 2-perfluorodecylethyl acrylate, 2-perfluorohexadecylethyl acrylate, and other acrylates; and methacrylates corresponding thereto.

These may be used alone or in combination of two or more thereof.

The main chain of the (meth)acrylic polymer (A) is not particularly limited as far as the main chain is a main chain containing alkyl acrylate monomer units and/or alkyl methacrylate monomer units. The main chain contains these monomer units preferably in a proportion more than 50% by mass, more preferably in a proportion of 70% or more by mass since the polymer having the main chain is high in availability and the cured product obtained therefrom is good in weather resistance and low-temperature flexibility.

The main chain of the (meth)acrylic polymer (A) may contain, besides the alkyl acrylate monomer units and/or the alkyl methacrylate monomer units, units of a monomer copolymerizable with these units. For example, the following monomer units can be expected to produce a copolymerization effect for humidity curability, and curability of the inside: units of a carboxyl-group-containing monomer, such as acrylic acid, methacrylic acid and the like; units of an amide-group-containing monomer, such as acrylamide, methacrylamide, N-methylolacrylamide, N-methylolmethacrylamide and the like; units of an epoxy-group-containing monomer, such as glycidyl acrylate, glycidyl methacrylate and the like; units of an amino-group-containing monomer, such as diethylaminoethyl acrylate, diethylaminoethyl methacrylate, aminoethyl vinyl ether and the like; and polyoxyethylene acrylate, polyoxyethylene methacrylate and the like.

Other examples of the optional monomer units include monomer units each produced from acrylonitrile, styrene, α-methylstyrene, alkyl vinyl ether, vinyl chloride, vinyl acetate, vinyl propionate, ethylene and the like.

The composition of the monomers of the (meth)acrylic polymer (A) is appropriately selected in accordance with the usage or purpose (of the resin composition), and others.

When the monomer (used) has, in an alkyl ester moiety thereof, a long alky chain, the resultant polymer becomes low in glass transition temperature and the cured product produced therefrom is a rubbery elastomer soft in physical property. Reversely, when the monomer has a short alkyl chain, the resultant polymer becomes high in glass transition temperature and the cured product produced therefrom also becomes hard in physical property.

The physical property of the cured product also depends largely on the molecular weight of the polymer.

Accordingly, it is advisable that considering the molecular weight, the composition of the monomers of the (meth)acrylic polymer (A) is appropriately selected in accordance with a desired viscosity, and physical property of the cured product, and others.

The synthesis of the (meth)acrylic polymer (A) is not particularly limited, and may be in accordance with a known method.

The known method is, for example, a method disclosed in JP-A-61-271306 of causing a compound containing a functional group reactive with a hydroxyl group and the above-mentioned crosslinkable silyl group (for example, an isocyanate silane) to react with a telechelic polymer synthesized by use of a hydroxyl-group-containing initiator and having, at a terminal thereof, a hydroxyl group, thereby introducing the crosslinkable silyl group into the polymer terminal; or a method disclosed in JP-A-1-247403 of using dithiocarbamate having an alkenyl group or diallysulfide as a chain transfer agent, thereby using a polymer having, at both terminals thereof, alkenyl groups, respectively, and causing the polymer to react with a compound having a functional group reactive with the alkenyl groups and having the crosslinkable silyl group (examples of the compound: for example, trimethoxyhydrosilane, methyldimethoxyhydrosilane or the like) to introduce the crosslinkable silyl group into each of the polymer terminals.

The known method may be a method disclosed in JP-A-6-211922 of using a hydroxyl-group-containing polysulfide or an alcoholic compound as a chain transfer agent to produce an acrylic polymer having, at a terminal thereof, a hydroxyl group, and further using a reaction of the hydroxyl group to produce an acrylic polymer having, at a terminal thereof, an alkenyl group; or some other method. By use of this acrylic polymer, which has at a terminal thereof an alkenyl group, the above-mentioned crosslinkable silyl group may be introduced into the polymer terminal in the same way.

JP-B-3-14068 discloses a method of polymerizing a (meth)acrylic monomer in the presence of a crosslinkable-silyl-group-containing mercaptan, a crosslinkable-silyl-group-containing disulfide, or a crosslinkable-silyl-group-containing radical polymerization initiator, thereby introducing the crosslinkable silyl group into a terminal of a polymer.

JP-B-4-55444 discloses a method of polymerizing an acrylic monomer in the presence of a crosslinkable-silyl-group-containing hydrosilane compound or a tetrahalosilane compound.

JP-A-5-97921 discloses a method of using a crosslinkable-silyl-group-having stabilized carbanion as an initiator to anion-polymerize an acrylic monomer, and causing a terminal of the polymer to react with a bifunctional electrophilic compound to introduce a crosslinkable silyl group into the polymer terminal.

A (meth)acrylic polymer obtained by any one of these methods, which has at a terminal thereof a crosslinkable silyl group, may be used as the (meth)acrylic polymer (A). However, there is a case where it is more preferred to use a (meth)acrylic polymer obtained by a different method for the following reason:

The above-mentioned methods have, for example, drawbacks that because of a low reactivity, it is usually difficult to introduce a crosslinkable silyl group certainly into a polymer terminal, and one or more of the raw materials are expensive to cause a poor economic efficiency. Moreover, polymers obtained by these free-radical polymerization methods each have a problem that the polymer has a large molecular weight distribution value of two or more to become high in viscosity. Furthermore, the use of the chain transfer agent makes it difficult to yield a high-molecular-weight (meth)acrylic polymer to result in a problem that the resultant polymer becomes short in molecular weight between crosslinking points to be poor in elongation or endurance when the polymer is used as a sealing material.

Thus, a living radical polymerization may be used as a method for yielding a (meth)acrylic polymer which is narrow in molecular weight distribution, is low in viscosity, and has a polymer terminal into which a crosslinkable functional group is certainly introduced.

Out of living radical polymerization methods, an "atom-transfer radical polymerization method" is disclosed, in particular, in Matyjaszewski et al., Journal of American Chemical Society (J. Am. Chem. Soc.) 1995, vol. 117, p. 5614, JP-A-9-272714, JP-A-2000-154205, and JP-A-2000-178456, this method being a method of polymerizing a (meth)acrylic monomer, using an atom-transfer halogenated organic material as an initiator, and a transition metal complex as a catalyst.

This method is more preferable as a method for producing the (meth)acrylic polymer having the specific functional group because of not only the above-mentioned characteristics of the "living radical polymerization method" but also the following matter: the compound concerned has, at a terminal thereof, a halogen or any other that is relatively favorable for functional-group-converting reaction, so that a freedom degree for the design of the initiator or catalyst is large.

Radical polymerization reaction is generally large in polymerization rate so that a termination reaction thereof is easily caused by coupling between radicals, or some other. Thus, it is generally said that the control of the reaction is difficult. However, the atom-transfer living radical polymerization method has characteristics that side reactions, such as a termination reaction at a growing terminal of the polymer, are not easily caused, and further the molecular weight (of the resultant) can be controlled at will in accordance with the charge ratio between the monomer and an initiator.

Furthermore, the molecular weight distribution of a polymer yielded by the atom-transfer radical polymerization method can be controlled into a very narrow range of 1.6 or less; thus, when (meth)acrylic polymers having the same number-average molecular weight are synthesized by this method and any conventional free radical polymerization method, respectively, the atom-transfer radical polymerization method makes it possible to makes the resultant (meth)acrylic polymer lower in viscosity than the conventional method. For this reason, a sealing material wherein the polymer yielded by this method is used is low in viscosity and excellent in workability.

Additionally, the atom-transfer radical polymerization method makes it possible to introduce a functional group at a high efficiency into a terminal of a polymer, and makes it possible to synthesize a telechelic polymer having, at both terminals thereof, functional groups, respectively, when use is made of a halogenated organic material or halogenated sulfonyl having two or more initiation points. Thus, a cured product wherein the molecular weight between crosslinking points is long is yielded. As a result, the sealing using a polymer yielded by this method is higher in elongation and better in endurance than that yielded by the method using a conventional (meth)acrylic polymer having, in side chains of the molecule thereof, functional groups.

The molecular weight of the (meth)acrylic polymer (A) is not particularly limited. The number-average molecular weight, which is in terms of polystyrene molecular weight according to gel permeation chromatography (GPC), is preferably from 500 to 100,000 from the viewpoint of the degree of the easiness of the polymerization, the compatibility thereof (with the other raw materials), and the handling viscosity. The number-average molecular weight is preferably from 1,000 to 50,000 from the viewpoint of balance between the strength and the viscosity, and is more preferably from 2,000 to 30,000 from the viewpoint of a height in the workability and any other handleability, the bonding performance, and others.

About the (meth)acrylic polymer (A), one specie thereof is used alone or two or more species thereof are used in a mixture form.

The (meth)acrylic polymer (A) may be a known polymer. Specific examples thereof include KANEKA TELECHELIC POLYACRYLATEs-SA100S, SA110S, SA120S, SA310S and the like manufactured by Kaneka Corp.

The (meth)acrylic polymer (A) is incorporated into the present invention, whereby the composition of the present invention can have basic physical properties for sealing material, such as weather resistance and bonding performance.

<Diamine Compound (B)>

The diamine compound (B) contained in the composition of the present invention is a compound having a monovalent or divalent aliphatic or alicyclic hydrocarbon group that has 8 or more carbon atoms and may be branched, and having at least one primary amino group.

Examples of the diamine compound (B) include a diamine compound represented by the following formula (I) and used to produce the diamine compound (C), which will be described later, and a diamine compound represented by the following formula (III):

$$R^1-NH-R^2-NH_2 \quad (I),$$

and $$NH_2-R^9-NH_2 \quad (III)$$

wherein $R^1$ represents a monovalent aliphatic or alicyclic hydrocarbon group that may be branched, and has 8 or more carbon atoms, preferably 12 to 21 carbon atoms, more preferably 14 to 18 carbon atoms.

Specific examples of the monovalent aliphatic hydrocarbon group include an alkyl group, an alkenyl group, and the like. More specific and preferred examples thereof include alkyl groups such as a dodecyl group, a hexadecyl group, an octadecyl(stearyl) group and the like; and alkenyl groups such as an oleyl group, a linoleyl group, linolenyl group and the like, and the like.

Specific examples of the monovalent alicyclic hydrocarbon group include monocyclic cycloalkyl groups and ali-polycyclic cycloalkyl groups. More specific examples thereof include monocyclic cycloalkyl groups such as cyclooctyl, cyclodecyl, and cyclododecyl groups; ali-polycyclic cycloalkyl groups such as isobornyl, tricyclodecyl, tetracyclododecyl, and adamanthyl groups; groups each obtained by substituting hydrogen atoms of any one of these monovalent alicyclic groups partially with any group, or two or more groups identical or different in kind that are selected from linear, branched or cyclic alkyl groups having 1 to 4 carbon atoms; examples of the alkyl groups include methyl, ethyl, n-propyl, i-propyl, n-butyl, 2-methylpropyl, 1-methylpropyl, and t-butyl groups.

Of these examples, a stearyl or oleyl group is preferred as $R^1$ since the corresponding compound (B) is easily available and the resultant cured product is excellent in stain resistance.

In the meantime, $R^2$ in the formula (I) represents a bivalent hydrocarbon group that may be branched and has 2 to 18 carbon atoms, preferably 2 to 8 carbon atoms, more preferably 2 to 4 carbon atoms.

Specific examples of the bivalent hydrocarbon group include alkylene groups. More specific and preferred examples thereof include ethylene, 1,2-propylene, 1,3-propylene, and 1,4-butylene groups.

Of these examples, any propylene group is preferred since the corresponding compound is easily available.

In the formula (III), $R^9$ represents a bivalent aliphatic or alicyclic hydrocarbon group that may be branched and has 8 or more carbon atoms, preferably 8 to 20 carbon atoms, more preferably 10 to 14 carbon atoms.

Specific examples of the bivalent aliphatic hydrocarbon group include alkylene groups. More specific and preferred examples thereof include undecane and dodecane groups since the corresponding compound (B) is easily available and the resultant cured product is excellent in stain resistance.

The diamine compound (B) may denote, for example, a compound made only of any one from compounds represented by the formula (I) or (III), or may collectively denote several compounds therefrom.

In the present invention, the content of the diamine compound (B) is from 0.1 to 100 parts by mass, preferably from 1 to 10 parts by mass, more preferably from 2 to 5 parts by mass for 100 parts by mass of the (meth)acrylic polymer (A).

When the content of the diamine compound (B) is in this range, the cured product of the resultant composition of the present invention has no surface tackiness. As referred to in Patent Document 6, a reason therefor would be as follows: when the composition of the present invention is exposed to the atmosphere, the diamine compound (B) bleeding out onto the surface of the curd product reacts with carbon dioxide gas in the air to produce crystalline carbamic acid; and this crystal of carbamic acid functions as a protecting film.

In the present invention, the diamine compound (B) may be a commercially available product, such as hardened beef tallow propylenediamine (trade name: ASPHASOL #10, manufactured by NFO Corp.), beef tallow propylenediamine (trade name: ASPHASOL #20, manufactured by NFO Corp.), and oleylpropylenediamine (trade name: AMINE DOB, manufactured by NFO Corp.).

<Diamine Compound (C)>

The diamine compound (C) contained in the composition of the present invention is a compound having a monovalent aliphatic or alicyclic hydrocarbon group that has 8 or more carbon atoms and may be branched, and having a crosslinkable silyl group and/or a (meth)acryloyl group.

In the present invention, the content of the diamine compound (C) is from 0.1 to 100 parts by mass, preferably from 1 to 10 parts by mass, more preferably from 2 to 5 parts by mass for 100 parts by mass of the (meth)acrylic polymer (A).

When the content of the diamine compound (C) is in this range, the resultant composition of the present invention can keep a high stain resistance over a long term from an initial stage just after a process in which the composition is applied. Reasons therefor would be as follows: when the composition of the present invention is exposed to the atmosphere, the diamine compound (C) bleeds out, in the same manner as the diamine compound (B), onto the surface of the curd product to react with carbon dioxide gas in the air to produce crystalline carbamic acid; and further the crosslinkable silyl group in the diamine compound (C) is bonded to the crosslinkable silyl group in the (meth)acrylic polymer (A), and/or the (meth) acryloyl group in the diamine compound (C) is bonded through radical reaction to the (meth)acrylic polymer (A), whereby a crystalline protecting film is fixed onto the surface of the cured product to prevent a peel (of a surface portion of the product) based on a deterioration of the surface with time, and an outflow thereof based on rainwater.

In the present invention, the diamine compound (C) is preferably a reaction product (C1) made from a diamine compound (c11) represented by the following formula (I), an epoxysilane (c12), and a (meth)acryloyl-group-containing compound (c13):

$$R^1-NH-R^2-NH_2 \quad (I)$$

(Diamine Compound (c11))

The diamine compound (c11) is a diamine compound represented by the above-mentioned formula (I), and is the same as described as an example of the diamine compound (B).

(Epoxysilane (c12))

The epoxysilane (c12) is not particularly limited as far as the compound is a silane coupling agent having an epoxy group. Specific examples thereof include γ-glycidoxypropyldimethylethoxysilane, γ-glycidoxypropylmethyldimethoxysilane, γ-glycidoxypropylmethyldiethoxysilane, γ-glycidoxypropyltrimethoxysilane, γ-glycidoxypropyltriethoxysilane, β-(3,4-epoxycyclohexyl)ethylmethyltrimethoxysilane, β-(3,4-epoxycyclohexyl)ethylmethyldimethoxysilane, epoxy-group-modified silicone resin, silyl-group-modified epoxy resin, a copolymer composed of an epoxy resin and a silicone resin, and the like.

Of these examples, preferred are γ-glycidoxypropyltrimethoxysilane, and γ-glycidoxypropylmethyldiethoxysilane since they are better in bonding performance.

In the present invention, the epoxysilane (c12) may be a commercially available product, such as γ-glycidoxypropylmethyldiethoxysilane (KBE402, manufactured by Shin-Etsu Chemical Co., Ltd.), γ-glycidoxypropyltrimethoxysilane (KBM403, manufactured by Shin-Etsu Chemical Co., Ltd.), SH6040 (manufactured by Dow Corning Toray Co., Ltd.), or SILQUEST A-187 or TSL8350 (manufactured by Momentive Performance Materials Japan LLC.).

((Meth) Acryloyl-Group-Containing Compound (c13))

The (meth)acryloyl-group-containing compound (c13) is not particularly limited as far as the compound is a compound having a (meth)acryloyl group. Specific examples thereof include (meth)acrylic acid esters, (meth)acrylonitrile, (meth)acrylic acid, (meth)acrylamide and the like.

Of these examples, preferred are (meth)acrylic acid esters since they are high in reactivity with the diamine compound (c11) and in handleability.

The (meth)acrylic acid esters are, for example, alkyl(meth)acrylates, and a specific and preferred example thereof is a compound represented by the following general formula (4):

[Formula 4]

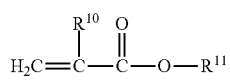

(4)

In the formula, $R^{10}$ is a hydrogen atom or a methyl group, and $R^{11}$ is an aliphatic hydrocarbon group, an alicyclic hydrocarbon group or an aromatic hydrocarbon group.

Specific examples of the aliphatic hydrocarbon group include linear alkyl groups such as methyl, ethyl, propyl, butyl, pentyl, octyl, dodecyl, and stearyl groups; branched alkyl groups such as isobutyl, s-butyl, t-butyl, isopentyl, neopentyl, t-pentyl, 1-methylbutyl, 1-methylheptyl, and 2-ethylhexyl groups; and alkenyl groups such as buta-2-ene-1-yl (—CH$_2$—CH=CH—CH$_3$), and buta-3-ene-1-yl (—CH$_2$—CH$_2$—CH=CH$_2$); alkynyl groups such as buta-2-yn-1-yl (—CH$_2$—C≡C—CH$_3$), and buta-3-ene-1-yl (—CH$_3$—CH$_2$—C≡CH).

Specific examples of the alicyclic hydrocarbon group include cyclohexyl, methylcyclohexyl and ethylcyclohexyl groups, and substituents represented by formulae (5) and (6) illustrated below.

Specific examples of the aromatic hydrocarbon group include aralkyl groups such as benzyl and phenethyl groups; and aryl groups such as (o-, m- and p-) tolyl, dimethylphenyl, and mesityl groups.

[Formula 5]

(5)

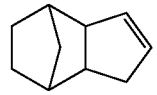

(6)

In the present invention, the alkyl(meth)acrylate represented by the formula (4) is preferably an alkyl(meth)acrylate wherein $R^{11}$ is a saturated hydrocarbon group because of a high availability, a high economical efficiency and a high handleability thereof. Specific examples thereof include compounds represented by the following formulae:

[Formula 6]

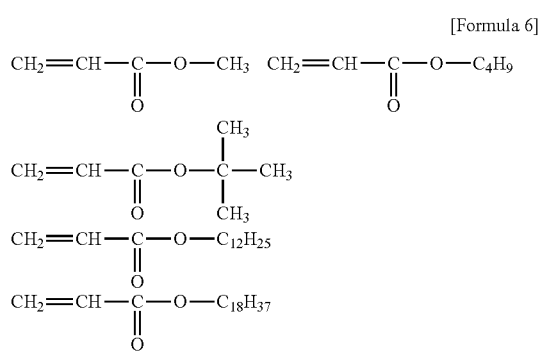

In the present invention, the alkyl(meth)acrylate represented by the formula (4) is preferably an alkyl(meth)acrylate wherein $R^{11}$ is an unsaturated hydrocarbon group because the resultant cured product is excellent in weather resistance and in initial stain resistance. A specific example thereof is a compound represented by the following formula:

[Formula 7]

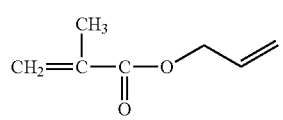

In the present invention, the alkyl(meth)acrylate represented by the formula (4) is preferably an alkyl(meth)acrylate wherein $R^{11}$ has a cyclic structure because the resultant cured product is excellent in weather resistance, in initial and long-term stain resistances and in bonding performance. Specific examples thereof include compounds represented by the following formulae:

[Formula 8]

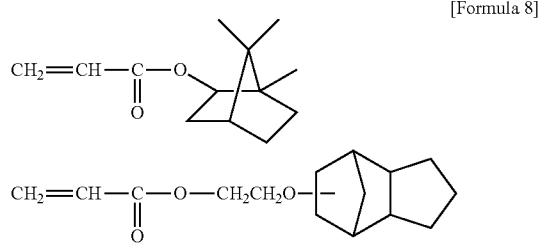

In the present invention, the (meth)acryloyl-group-containing compound (c13) may be a commercially available product, such as LIGHT ACRYLATE IBXA (manufactured by Kyoeisha Chemical Co., Ltd.), NK ECONOMERs-AL, AL-4G, AL-8G, and AL-12G (each manufactured by Shin-Nakamura Chemical Co., Ltd.), FANCRYLs FA-511A, FA-512A, FA-513A, and FA-BZA (each manufactured by Hitachi Chemical Co., Ltd.), and ADAMANTATEs MM, HM, EM, HA, MA, and EA (each manufactured by Idemitsu Kosan Co., Ltd.), and the like.

Preferred examples of the combination of the diamine compound (c11), the epoxysilane (c12) and the (meth)acryloyl-group-containing compound (c13) are as follows:

[Formula 9]

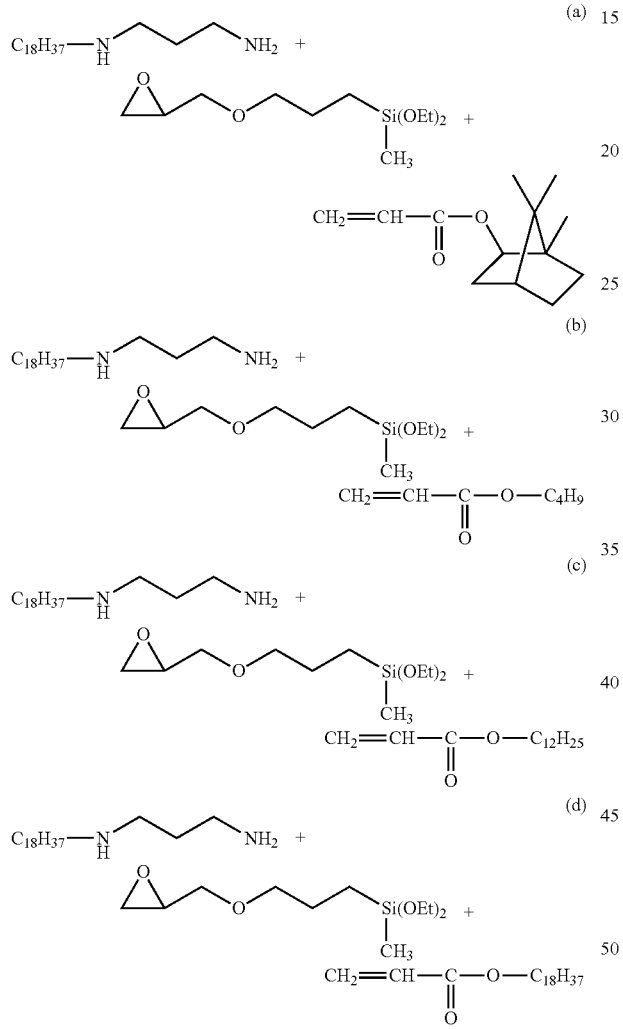

[Formula 10]

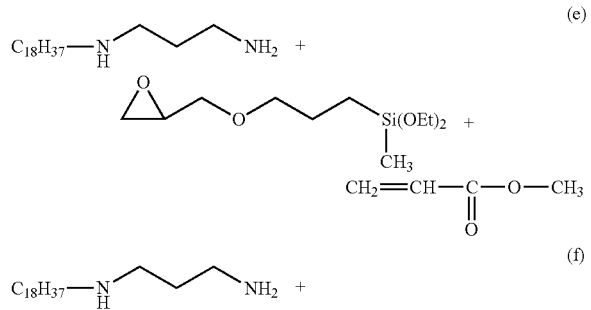

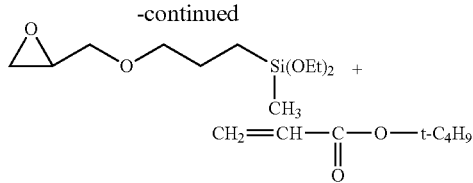

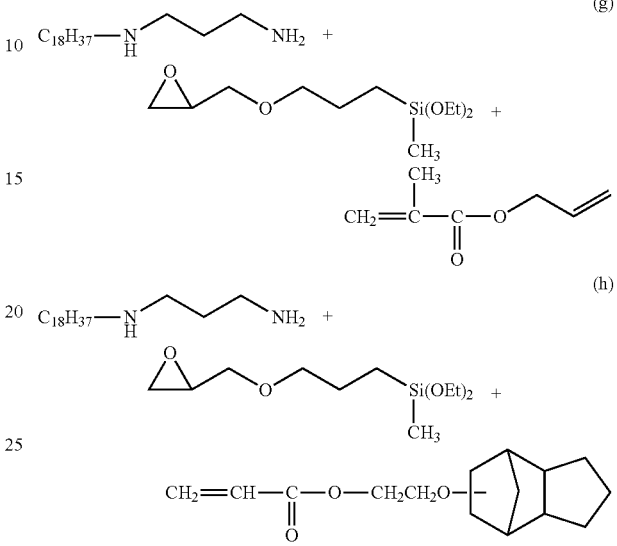

In the present invention, conditions for a reaction between the diamine compound (c11), the epoxysilane (c12) and the (meth)acryloyl-group-containing compound (c13) are not particularly limited. Preferably, these compounds are stirred at 60 to 80° C. for 4 to 24 hours under conditions that the ratio by mole of the diamine compound (c11) to the epoxysilane (c12) to the (meth)acryloyl-group-containing compound (c13), i.e., the ratio by mole of (c11)/(c12)/(c13) is from 1/0.1-3.0/0.1-3.0. This reaction gives a reaction product (C1) having a monovalent aliphatic or alicyclic hydrocarbon group that has 8 or more carbon atoms and may be branched, and a crosslinkable silyl group.

In the meantime, in the present invention, the diamine compound (C) is preferably a diamine compound (C2) represented by the following formula (II):

$$R^1—NR^3—R^2—NR^4R^5 \qquad (II)$$

In the formula (II), $R^1$ represents a monovalent aliphatic or alicyclic hydrocarbon group that has 8 or more carbon atoms and may be branched, and $R^2$ represents a bivalent hydrocarbon group that has 2 to 18 carbon atoms, may have an oxygen atom, and may be branched. $R^1$ and $R^2$ are identical with $R^1$ and $R^2$ in the formula (I), respectively.

In the formula (II), $R^3$, $R^4$ and $R^5$ each independently represent a hydrogen atom, or an organic group that has 1 to 30 carbon atoms, preferably 2 to 20 carbon atoms, and that may contain a (meth)acryloyl group provided that at least one thereof represents a (meth)acryloyl-group-containing group.

When the diamine compound (C2) is, for example, a reaction product made from a diamine compound (c21) and a compound (c22) having, in the molecule thereof, two or more (meth)acryloyl groups or a compound (c23) having, in a single molecule thereof, one or more (meth)acryloyl groups and one or more epoxy groups, these compounds being to be described below, the above-mentioned organic group may be a residue of the compound (c22) or compound (c23) that is obtained after a reaction between the amino or imino group of the diamine compound (c21) and the (meth)acryloyl group of the compound (c22) or compound (c23).

In the present invention, the diamine compound (C2) is preferably a reaction product made from a diamine compound (c21) represented by the following formula (I), and a compound (c22) having, in a single molecule thereof, two or more (meth)acryloyl groups.

$$R^1—NH—R^2—NH_2 \quad (I)$$

(Diamine Compound (c21))

The diamine compound (c21) is a diamine compound represented by the formula (I), and is the same as described as an example of the diamine compound (B).

(Compound (c22))

The compound (c22) is not particularly limited as far as the compound is a compound having two or more (meth)acryloyl groups. A specific example thereof is a compound represented by the following formula (LIGHT ACRYLATE DCP-A, manufactured by Kyoeisha Chemical Co., Ltd.):

[Formula 11]

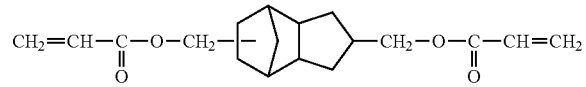

A preferred combination of the diamine compound (c21) with the compound (c22) is as follows:

[Formula 12]

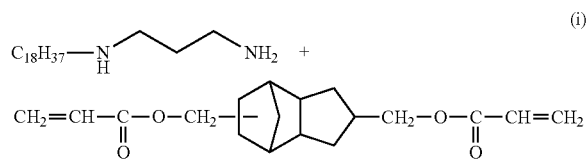

In the present invention, conditions for a reaction between the diamine compound (c21) and the compound (c22) are not particularly limited. Preferably, these compounds are stirred at 60 to 80° C. for 0.5 to 2 hours under conditions that the ratio by mole of the diamine compound (c21) to the compound (c22), i.e., the ratio by mole of (c21)/(c22) is from 1/0.1-3. This reaction gives a reaction product (C2) having a monovalent aliphatic or alicyclic hydrocarbon group that has 8 or more carbon atoms and may be branched, and a (meth)acryloyl group.

In the present invention, the diamine compound (C2) is also preferably a reaction product made from a diamine compound (c21) represented by the following formula (I), and a compound (c23) having, in a single molecule thereof, one or more (meth)acryloyl groups, and one or more epoxy groups:

$$R^1—NH—R^2—NH_2 \quad (I)$$

(Diamine Compound (c21))

The diamine compound (c21) is a diamine compound represented by the formula (I), and is the same as described as an example of the diamine compound (B).

(Compound (c23))

The compound (c23) is not particularly limited as far as the compound is a compound having a (meth)acryloyl group and an epoxy group.

Specific examples thereof include glycidyl methacrylate, and glycidyl acrylate.

A preferred combination of the diamine compound (c21) with the compound (c23) is as follows:

[Formula 13]

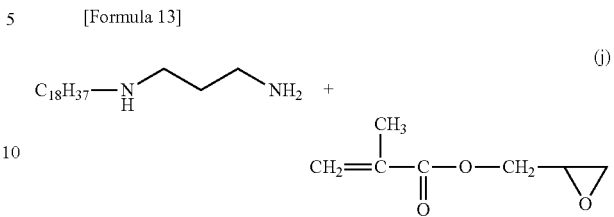

In the present invention, conditions for a reaction between the diamine compound (c21) and the compound (c23) are not particularly limited. Preferably, these compounds are stirred at 60 to 80° C. for 1 to 12 hours under conditions that the ratio by mole of the diamine compound (c21) to the compound (c23), i.e., the ratio by mole of (c21)/(c23) is from 1/0.1-3.

This reaction gives a reaction product (C2) having a monovalent aliphatic or alicyclic hydrocarbon group that has 8 or more carbon atoms and may be branched, and a (meth)acryloyl group.

Furthermore, in the present invention, the diamine compound (C2) preferably contains a crosslinkable silyl group.

Thus, it is preferred that in the reaction between the diamine compound (c21) and the compound (c22) or compound (c23), a reaction reagents such as an epoxy silane, amino silane and the like are simultaneously caused to react therewith.

Specific examples of the epoxysilane may be equivalent to those of the epoxysilane (c12).

Specific examples of the aminosilane include aminosilane compounds having an aliphatic primary amino group, such as γ-aminopropyltrimethoxysilane, γ-aminopropyltriethoxysilane, γ-aminopropylmethyldimethoxysilane, γ-aminopropylmethyldiethoxysilane, 4-amino-3,3-dimethylbutyltrimethoxysilane and the like; aminosilane compounds having an aliphatic secondary amino group, such as N,N-bis[(3-trimethoxysilyl)propyl]amine, N,N-bis[(3-triethoxysilyl)propyl]amine, N,N-bis[(3-tripropoxysilyl)propyl]amine, 3-(n-butylamino)propyltrimethoxysilane, N-ethyl-aminoisobutyltrimethoxysilane and the like; aminosilane compounds having aliphatic primary and secondary amino groups, such as N-β(aminoethyl)γ-aminopropylmethyldimethoxysilane, N-β(aminoethyl)γ-aminopropyltrimethoxysilane, N-β(aminoethyl)γ-aminopropyltriethoxysilane and the like; aminosilane compounds having an aromatic secondary amino group, such as N-phenyl-γ-aminopropyltrimethoxysilane and the like; and aminosilane compounds having a heterocyclic amino group, such as imidazoletrimethoxysilane, and triazolesilane yielded by causing aminotriazole to react with an epoxysilane compound, an isocyanatesilane compound or some other compound in the presence or absence of a catalyst at room temperature or higher.

<Photopolymerization Initiator (D)>

The photopolymerization initiator (D), which is contained in the present invention if desired, is not particularly limited as far as the initiator is an initiator capable of polymerizing a monomer by aid of light.

The photopolymerization initiator (D) is preferably a radical photoinitiator, or an anion photoinitiator, and is in particular preferably a radical photoinitiator.

Examples of the photopolymerization initiator (D) include acetophenone based compounds, benzoin ether based compounds, benzophenone based compounds, sulfur compounds, azo compounds, peroxide compounds, phosphine oxide based compounds and the like.

Specific examples thereof include acetophenone, propiophenone, benzophenone, xanthol, fluorein, benzaldehyde, anthraquinone, triphenylamine, carbazole, 3-methylacetophenone, 4-methylacetophenone, 3-pentylacetophenone, 2,2-diethoxyacetophenone, 4-methoxyacetophenone, 3-bromoacetophenone, 4-allylacetophenone, p-diacetylbenzene, 3-methoxybenzophenone, 4-methylbenzophone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoyl, benzoin methyl ether, benzoin butyl ether, bis(4-dimethylaminophenyl)ketone, benzylmethoxyketal, 2-chlorothioxanthone, 2,2-dimethoxy-1,2-diphenylethane-1-one, 1-hydroxy-cyclohexyl phenyl ketone, 2-hydroxy-2-methyl-1-phenyl-propane-1-one, 1-[4-(2-hydroxyethoxy)-phenyl]-2-hydroxy-2-methyl-1propane-1-one, 2-hydroxy-1-{4-[4-(2-hydroxy-2-methyl-propionyl)benzyl]phenyl}-2-methyl-propane-1-one, 2-methyl-1-(4-methylthiophenyl)-2-morpholinopropane-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, 2-hydroxy-1-{4-[4-(2-hydroxy-2-methyl-propionyl)benzyl]phenyl}-2-methyl-propane-1-one, bis(2,4,6-trimethylbenzoyl)-phenylphosphine oxide, bis(2,6-dimethoxybenzoyl)-2,4,4-trimethylpentylphosphine oxide, 2,4,6-trimethylbenzoyl-diphenyl-phosphine oxide and the like.

These initiators may be used alone or may each be used in a combination with one or more different compounds. Specific examples of the combination include a combination with an amine such as diethanol/methylamine, dimethylethanolamine, triethanolamine and the like; a combination wherein the combination is further combined with a iodonium salt such as diphenyliodonium chloride and the like; and a combination with a colorant such as methylene blue and the like, and an amine.

When the polymerization photoinitiator is used, a polymerization inhibitor may be added thereto if necessary, the examples thereof including hydroquinone, hydroquinone monomethyl ether, benzoquinone, p-tert-butylcatechol and the like.

[Formula 14]

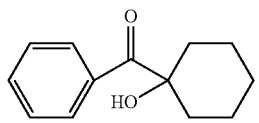

(7)

Of these inhibitors, more preferred are 2,2-dimethoxy-1,2-diphenylethane-1-one (IRGACURE 651 manufactured by Ciba Japan K.K.), 2-hydroxy-1-{4-[4-(2-hydroxy-2-methyl-propionyl)benzyl]phenyl}-2-methyl-propane-1-one (IRGACURE 127, manufactured by Ciba Japan K.K.), and others since the resultant cured product is less colored.

When the initiator (D) is contained in the present invention, the content proportion of the photopolymerization initiator (D) is as follows: the amount of the initiator (D) is preferably from 0.01 to 10 parts by mass, more preferably from 0.1 to 3 parts by mass for 100 parts by mass of the (meth)acrylic polymer (A) from the viewpoint of a good stain resistance of the resultant cured product, and economical efficiency.

When the composition of the present invention is used as a sealing material or some other, the following may be blended therewith as far as the advantageous effects of the present invention are not damaged: a polymer having a polyether as a main chain and having a crosslinkable silyl group, a curing catalyst, a dehydrating agent, a plasticizer, a filler, a reinforcing agent, an anti-sagging agent, a colorant (pigment), an anti-aging agent, a catalytic promoter, and others.

Specific examples of the curing catalyst include carboxylic acid metal salts such as zinc octoate (or octanoate), iron octoate, manganese octoate, tin octoate, zinc naphthenoate, iron naphthenoate, tin butanoate, tin caprate, tin oleate and the like; organic tin compounds, such as dibutyltin diacetate, dibutyltin dioctoate, dibutyltin dilaurate, dibutyltin dioleate, dioctyltin dilaurate, diphenyltin diacetate, dibutyltin oxide, a reaction product made from dibutyltin oxide and a phthalate, dibutyltin dimethoxide, dibutyltin(triethoxysiloxy) and the like; tin chelate compounds such as dibutyltin diacetylacetonate and the like; titanium alkoxides such as tetraethoxytitanium, tetrapropoxytitanium, tetrabutoxytitanium, tetra-2-ethylhexyloxytitanium, tetraisopropenyloxytitanium and the like; titanium chelate compounds such as diisopropoxytitanium bis(acetylacetonate), diisopropoxytitanium bis(ethylacetoacetate), 1,3-propanedioxytitanium bis(acetylacetoante), 1,3-propanedioxytitanium bis(ethylacetoacetate), titanium tris(acetylacetoante) and the like; zirconium alkoxides such as tetraisopropoxyzirconium, tetrabutoxyzirconium, tributoxyzirconium stearate and the like; zirconium chelate compounds such as zirconium tetra(acetylacetoante) and the like; aluminum alkoxides such as triethoxyaluminum, tripropoxyaluminum, tributoxyaluminum and the like; aluminum chelate compounds such as diisopropoxyaluminum (ethylacetoacetate), aluminum tris(acetylacetonate), aluminum tris(ethylacetoacetate) and the like; primary amines such as butylamine, hexylamine, octylamine, dodecylamine, oleylamine, cyclohexylamine, benzylamine and the like; secondary amines such as dibutylamine and the like; polyamines such as diethylenetriamine, triethylenetetramine, guanidine, diphenylguanidine, xylylenediamine and the like; cyclic amines such as triethylenediamine, morpholine, N-methylmorpholine, 2-ethyl-4-methylimidazole, 1,8-diazabicyclo[5.4.0]-7-undecene and the like; aminoalcohol compounds such as monoethanolamine, diethanolamine, triethanolamine and the like; aminophenol compounds and other amine compounds, such as 2,4,6-tris(dimethylaminomethyl)phenol, and carboxylic salts thereof and the like; quaternary ammonium salts, such as benzyltriethylammonium acetate and the like; low-molecular-weight amide resins each obtained from an excessive amount of a polyamine, and a polybasic acid; a reaction product made from an excessive amount of a polyamine, and an epoxy compound; and amino-group-containing silanes such as 3-aminopropyltrimethoxysilane, 3-aminopropyltriethoxysilane, N-(2-aminoethyl)-3-aminopropyltrimethoxysilane, N-(2-aminoethyl)-3-aminopropyl(methyl)trimethoxysilane and the like, and the like. Additionally, a known compound effective for a hydrolyzing reaction and/or condensing reaction of a silyl group may be used. It is allowable to use, out of these examples of the curing catalyst, one or a combination of two or more as the (collectively denoted) curing catalyst component.

Of these examples, preferred are metal compounds since the compounds do not volatize easily when stored or handled, and particularly preferred are organic tin compounds, tin chelate compounds, and titanates since they each give an excellent catalytic performance when incorporated (into the composition) even in a trace quantity.

Specific examples of the dehydrating agent include hydrolyzable ester compounds such as methyl orthoformate, ethyl orthoformate, methyl orthoacetate, ethyl orthoacetate, trimethyl orthopropionate, triethyl orthopropionate, trimethyl orthoisopropionate, triethyl orthoisopropionate, trimethyl orthobutyrate, triethyl orthobutyrate, trimethyl orthoisobutyrate, triethyl orthoisobutyrate and the like; dimethoxymethane, 1,1-dimethoxyethane, 1,1-dimethoxypropane, and 1,1-dimethoxybutane; ethyl silicate (tetramethoxysilane), methyl silicate (tetramethoxysilane), and methyltrimethoxysilane; aminosilanes, such as γ-aminopropyltrimethoxysilane, γ-aminopropyltriethoxysilane, γ-aminopropylmethyldimethoxysilane, γ-aminopropylethyldiethoxysilane, bistrimethoxysilylpropylamine, bistriethoxysilylpropylamine, bismethoxydimethoxysilylpropylamine, bisethoxydiethoxysilylpropylamine, N-β(aminoethyl)γ-aminopropyltrimethoxysilane, N-β(aminoethyl)γ-aminopropylmethyldimethoxysilane, N-β(aminoethyl)γ-aminopropyltriethoxysilane, and N-β(aminoethyl)γ-aminopropylethyldiethoxysilane; and vinylsilanes such as vinyltrimethoxysilane, and vinyltriethoxysilane. Of these examples, aminosilanes and vinylsilanes are preferred from the viewpoint of dehydrating effect. These may be used alone or in combination of two or more thereof.

The plasticizer is used to adjust the viscosity and the physical property (of the composition). General examples thereof include derivatives of benzoic acid, phthalic acid, trimellitic acid, pyromellitic acid, adipic acid, sebacic acid, fumaric acid, maleic acid, itaconic acid, citric acid and others; and polyester-, polyether- and epoxy-type plasticizers.

The filler which may be of various types may be incorporated to adjust the mechanical property, and may be generally calcium carbonate, talc, silica, carbon black or some other. In accordance with the activity, the particle form and the pH of the filler, a matter as to whether or not the filler is surface-treated, and others, a large effect is produced onto the storage stability, the curing rate, the physical property, and the foaming property. Thus, it is necessary to decide the kind and the amount thereof carefully. About calcium carbonate particularly, it is preferred to use a species thereof that is treated with an aliphatic acid ester or a higher alcohol urethane compound.

Specific examples of the colorant (pigment) include inorganic pigments such as titanium oxide, zinc oxide, ultramarine blue, red iron oxide, lithopone, lead, cadmium, iron, cobalt, aluminum, hydrochlorides, sulfates and the like; and organic pigments such as azo pigments, phthalocyanine pigments, quinacridon pigments, quinacridon quinone pigments, dioxazine pigments, anthrapyrimidine pigments, anthanthrone pigments, indanthrone pigments, flavanthrone pigments, perylene pigments, perynone pigments, diketopyrrolopyrrole pigments, quinonaphtharone pigments, anthraquinone pigments, thioindigo pigments, benzimidazolone pigments, isoindoline pigments, carbon black and the like.

Specific examples of the anti-aging agent include ordinarily-used antioxidants, ultraviolet absorbents and light stabilizers, which may be appropriately used. Examples thereof include hindered amine type, benzotriazole type, benzophenone type, benzoate type, cyanoacrylate type, acrylate type, hindered phenol type, phosphorus-containing type, and sulfur-containing type compounds.

The method for producing the composition of the present invention is not particularly limited. The composition may be produced by mixing the components thereof with each other by means of, for example, a roll, a kneader, an extruder, or a universal stirring machine.

The use of the curable resin composition is not particularly limited. The composition may be used, for example, for various adhesive agents, sealing materials, and waterproof materials.

EXAMPLES

Hereinafter, the present invention will be specifically described by way of working examples. However, the present invention is not limited thereto.

1. Synthesis of Diamine Compounds (C1)

As will be described in the following Synthesis Examples 1 to 6, stain resistant agents A to F were each synthesized as a diamine compound (C1) yielded by causing a diamine compound (c11), an epoxysilane (c12) and a (meth)acryloyl-group-containing compound (c13), which have been defined above, to react with each other. The advance of the reaction was checked through peaks of the functional groups (concerned) according to $^1$H-NMR.

Synthesis Example 1

Oleylpropylenediamine (trade name: NISSAN AMINE DOB-R, manufactured by NFO Corp.) was dehydrated at 80° C. under a reduced pressure for 1 hour, and then cooled to 60° C. Thereto was added γ-glycidoxypropylmethyldiethoxysilane (trade name: KBE 402, manufactured by Shin-Etsu Chemical Co., Ltd.) in an equimolar amount. The components were caused to react with each other at 60° C. for 10 hours, and then thereto was added isobornyl acrylate (trade name: IBXA, manufactured by Osaka Organic Chemical Industry Ltd.) in an equimolar amount. The reactive components were caused to react with each other at 70° C. for 8 hours to yield the above-mentioned stain resistant agent A.

Synthesis Example 2

Oleylpropylenediamine (trade name: NISSAN AMINE DOB-R, manufactured by NFO Corp.) was dehydrated at 80° C. under a reduced pressure for 1 hour, and then cooled to 60° C. Thereto was added γ-glycidoxypropylmethyldiethoxysilane (trade name: KBE 402, manufactured by Shin-Etsu Chemical Co., Ltd.) in an amount of 1.8 mole per mole of oleylpropylenediamine. The components were caused to react with each other at 60° C. for 3 hours and subsequently at 70° C. for 10 hours. Thereto was added butyl acrylate (reagent manufactured by Wako Pure Chemical Industries, Ltd.) in an amount equimolar to oleylpropylenediamine. The reactive components were caused to react with each other at 70° C. for 6 hours and subsequently at 110° C. for 14 hours to yield the stain resistant agent B.

Synthesis Example 3

Hardened beef tallow alkylpropylenediamine (trade name: ASPHASOL 10, manufactured by NFO Corp.) was dehydrated at 80° C. under a reduced pressure for 1 hour, and then cooled to 60° C. Thereto was added γ-glycidoxypropylmethyldiethoxysilane (trade name: KBE 402, manufactured by Shin-Etsu Chemical Co., Ltd.) in an equimolar amount. The components were caused to react with each other at 60° C. for 9 hours, and then thereto was added butyl acrylate (reagent manufactured by Wako Pure Chemical Industries, Ltd.) in an equimolar amount. The reactive components were caused to react with each other at 60° C. for 5 hours to yield the stain resistant agent C.

Synthesis Example 4

Hardened beef tallow alkylpropylenediamine (trade name: ASPHASOL 10, manufactured by NFO Corp.) was dehydrated at 80° C. under a reduced pressure for 1 hour, and then cooled to 60° C. Thereto was added γ-glycidoxypropylmethyldiethoxysilane (trade name: KBE 402, manufactured by Shin-Etsu Chemical Co., Ltd.) in an equimolar amount. The components were caused to react with each other at 70° C. for 5 hours, and then thereto was added octadecyl acrylate (reagent manufactured by Wako Pure Chemical Industries, Ltd.) in an equimolar amount. The reactive components were caused to react with each other at 70° C. for 6 hours to yield the stain resistant agent D.

Synthesis Example 5

Hardened beef tallow alkylpropylenediamine (trade name: ASPHASOL 10, manufactured by NFO Corp.) was dehydrated at 80° C. under a reduced pressure for 1 hour, and then thereto was added allyl methacrylate (reagent manufactured by Wako Pure Chemical Industries, Ltd.) in an equimolar amount. The components were caused to react with each other at 80° C. for 16 hours, and then thereto was added γ-glycidoxypropylmethyldiethoxysilane (trade name: KBE 402, manufactured by Shin-Etsu Chemical Co., Ltd.) in an equimolar amount. The reactive components were caused to react with each other at 80° C. for 8 hours to yield the stain resistant agent E.

Synthesis Example 6

To hardened beef tallow alkylpropylenediamine (trade name: ASPHASOL 10, manufactured by NFO Corp.) melted at 70° C. was added γ-glycidoxypropylmethyldiethoxysilane (trade name: KBE 402, manufactured by Shin-Etsu Chemical Co., Ltd.) in an equimolar amount. The system was cooled to 60° C., and the components were caused to react with each other for 1 hour, and then thereto was added isobornyl acrylate (trade name: IBXA, manufactured by Osaka Organic Chemical Industry Ltd.) in an equimolar amount. The reactive components were caused to react with each other at 60° C. for 3 hours and subsequently at 70° C. for 1 hour to yield the stain resistant agent F.

2. Synthesis of Diamine Compounds (C2)

As will be described in the following Synthesis Examples 7 to 9, stain resistant agents G to I were each synthesized as a diamine compound (C2) yielded by causing a diamine compound (c21) and a compound (c22) or compound (c23), which have been defined above, to react with each other. The advance of the reaction was checked through peaks of the functional groups (concerned) according to $^1$H-NMR.

Synthesis Example 7

Hardened beef tallow alkylpropylenediamine (trade name: ASPHASOL 10, manufactured by NFO Corp.) was dehydrated at 80° C. under a reduced pressure for 1 hour, and then cooled into 60° C. Thereto was added N-2-(aminoethyl)-3-aminopropylmethyldimethoxysilane (trade name: KM 602, manufactured by Shin-Etsu Chemical Co., Ltd.) as a reactive reagent in an amount of 0.9 mole per mole of the hardened beef tallow alkylpropylenediamine. Next, thereto was added dimethyloltricyclodecane diacrylate (trade name: LIGHT ACRYLATE DCP-A, manufactured by Kyoeisha Chemical Co., Ltd.) in an amount equimolar to the hardened beef tallow alkylpropylenediamine, and the reactive components were caused to react with each other at 60° C. for 30 minutes to yield the stain resistant agent G.

Synthesis Example 8

Hardened beef tallow alkylpropylenediamine (trade name: ASPHASOL 10, manufactured by NFO Corp.) was dehydrated at 80° C. under a reduced pressure for 1 hour, and then cooled into 70° C. Thereto was added glycidyl methacrylate (reagent manufactured by Wako Pure Chemical Industries, Ltd.) in an amount of 2.7 mole per mole of the hardened beef tallow alkylpropylenediamine. The reactive components were caused to react with each other at 80° C. for 8 hours to yield the stain resistant agent H.

Synthesis Example 9

To hardened beef tallow alkylpropylenediamine (trade name: ASPHASOL 10, manufactured by NFO Corp.) melted at 70° C. was added γ-glycidoxypropylmethyldiethoxysilane (trade name: KBE 402, manufactured by Shin-Etsu Chemical Co., Ltd.) as a reactive reagent in an equimolar amount. The system was cooled to 60° C., and the components were caused to react with each other for 2 hour. Thereto was then added glycidyl methacrylate (reagent manufactured by Wako Pure Chemical Industries, Ltd.) in an equimolar amount. The reactive components were caused to react with each other at 60° C. for 2 hours and subsequently at 70° C. for 1 hour to yield the stain resistant agent I.

Examples 1 to 15, and Comparative Examples 1 to 5

To 100 parts by mass of a modified silicone, which is a (meth)acrylic polymer (A) having a crosslinkable silyl group, was added each combination of some of composition components (parts by mass) shown in Table 1, and then the added components were dispersed therein by means of a blend mixer for high viscosity to prepare each of curable resin compositions of Examples 1 to 15, and Comparative Examples 1 to 5.

Examinations of each of the resultant curable resin compositions were made under conditions described below about the surface tackiness after the composition was cured, the stain resistance (initial stain resistance), the stain after the composition was cured (post-heating stain resistance), the weather resistance, and the bonding performance thereof. The results are shown in Table 1 described below.

<Surface Tackiness>

About each of the curable resin compositions of Examples 1 to 15, and Comparative Examples 1 to 5, the surface tackiness was examined after the composition was cured at 20° C. and a relative humidity of 55% for 24 hours. It was checked by touching the surface with fingers whether or not the composition had surface tackiness. Of the compositions, any one that had surface tackiness is represented by x (bad), any one that hardly had surface tackiness is represented by Δ (allowable), and any one that did not have surface tackiness at all is represented by ○ (good).

<(Initial) Stain Resistance>

About each of the curable resin compositions of Examples 1 to 15, and Comparative Examples 1 to 5, the stain resistance of the surface was examined after the composition was cured at 20° C. and a relative humidity of 55% for 24 hours. The stain resistance of the surface was checked by examining whether or not volcanic ash having a particle size of 200 mesh or less (hereinafter referred to as the sand) adhered onto the surface. Of these compositions, any one that was in a state that the sand adhered onto the surface is represented by x, any one that was in a state that the sand slightly adheres onto the surface is represented by Δ, and any one that was in a state that the sand did not adhere at all onto the surface is represented by ○.

<(Post-Heating) Stain Resistance>

About each of the curable resin compositions of Examples 1 to 15, and Comparative Examples 1 to 5, the composition was cured at 20° C. and a relative humidity of 55% for 24 hours, and then heated at 50° C. for 1 hour. After one minute from the end of the heating, the stain resistance of the surface was examined at 20° C. and a relative humidity of 55%. The stain resistance of the surface was checked by examining whether or not volcanic ash having a particle size of 200 mesh or less (hereinafter referred to as the sand) adhered onto the surface. Of these compositions, any one that was in a state that the sand adhered onto the surface is represented by x, any one that was in a state that the sand slightly adhered onto the surface is represented by Δ, and any one that was in a state that the sand did not adhere at all onto the surface is represented by ○.

<Weather Resistance>

Each of the curable resin compositions of Examples 1 to 15 and Comparative Examples 1 to 5 was made into the form of a sheet 3 mm in thickness. The sheet was cured (i.e., subjected to regimen) at 20° C. and a relative humidity of 55% for 14 days to be made into a test piece.

This test piece was treated with a metal halide weatherometer (conditions: 63° C.; relative humidity: 50%; optical energy: 75 mW/cm$^2$; and shower period: 120 seconds after every two hours). After 300 hours elapsed, as well as after 800 hours elapsed, the state of the surface of the cured product was observed, and then the weather resistance thereof was evaluated by examining whether or not the surface was cracked. Of these compositions, any one that was not cracked in the surface thereof is represented by ○.

<Bonding Performance>

Each of the curable resin compositions of Examples 1 to 15 and Comparative Examples 1 to 5 was painted into a thickness of 3 mm onto an acrylic-resin-electrodeposited aluminum piece (in black) manufactured by Sankyo Aluminum Industry Co., Ltd., and then the composition was cured to form a test body. Each of the test bodies was allowed to stand still at 20° C. and a relative humidity of 65% for 7 days, and then a hand-peeling test using a knife-cut was made to examine the bonding performance of the test body. Of these compositions, any one wherein interfacial peeling was caused in a proportion of 5% or more and less than 10% so that no practical problem was caused is represented by Δ, and any one wherein interfacial peeling was caused in a proportion of less than 5% is represented by ○.

TABLE 1

(No. 1)

| | Comparative Examples | | | | |
|---|---|---|---|---|---|
| | 1 | 2 | 3 | 4 | 5 |
| (Meth)acrylic polymer (A1) | 100 | 100 | 100 | 100 | 100 |
| Colloidal calcium carbonate | 120 | 120 | 120 | 120 | 120 |
| Ground calcium carbonate | 20 | 20 | 20 | 20 | 20 |
| Titanium oxide | 8 | 8 | 8 | 8 | 8 |
| Plasticizer 1 | 30 | 30 | 30 | 30 | 30 |
| Plasticizer 2 | 20 | 20 | 20 | 20 | 20 |
| Dehydrating agent 1 | 3 | 3 | 3 | 3 | 3 |
| Dehydrating agent 2 | 1 | 1 | 1 | 1 | 1 |
| Tin catalyst | 2 | 2 | 2 | 2 | 2 |
| Stearylamine | | 3 | | | |
| Diamine compound (B1) | | | 2 | 2 | |
| Known additive | | | | 2 | |
| Diamine compound (C) Stain resistant agent A | | | | | |
| Stain resistant agent B | | | | | |
| Stain resistant agent C | | | | | |
| Stain resistant agent D | | | | | |
| Stain resistant agent E | | | | | |
| Stain resistant agent F | | | | | |
| Stain resistant agent G | | | | | |
| Stain resistant agent H | | | | | |
| Stain resistant agent I | | | | | |
| Photopolymerization initiator (D1) | | | | | 1 |
| Surface tackiness | x | Δ | ○ | ○ | x |
| Initial stain resistance | x | Δ | Δ | ○ | x |
| Post-heating stain resistance | x | x | x | x | Δ |
| Weather resistance | ○ | ○ | ○ | ○ | ○ |
| Bonding performance | ○ | Δ | Δ | ○ | ○ |

TABLE 1

(No. 2)

| | Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Methacrylic polymer (A1) | 100 | 100 | 100 | 100 | 100 | 100 | 100 | 100 | 100 | 100 | 100 | 100 | 100 | 100 | 100 |
| Colloidal calcium carbonate | 120 | 120 | 120 | 120 | 120 | 120 | 120 | 120 | 120 | 120 | 120 | 120 | 120 | 120 | 120 |
| Ground calcium carbonate | 20 | 20 | 20 | 20 | 20 | 20 | 20 | 20 | 20 | 20 | 20 | 20 | 20 | 20 | 20 |
| Titanium oxide | 8 | 8 | 8 | 8 | 8 | 8 | 8 | 8 | 8 | 8 | 8 | 8 | 8 | 8 | 8 |
| Plasticizer 1 | 30 | 30 | 30 | 30 | 30 | 30 | 30 | 30 | 30 | 30 | 30 | 30 | 30 | 30 | 30 |
| Plasticizer 2 | 20 | 20 | 20 | 20 | 20 | 20 | 20 | 20 | 20 | 20 | 20 | 20 | 20 | 20 | 20 |
| Dehydrating agent 1 | 3 | 3 | 3 | 3 | 3 | 3 | 3 | 3 | 3 | 3 | 3 | 3 | 3 | 3 | 3 |
| Dehydrating agent 2 | 1 | 1 | 1 | 1 | 1 | 1 | 1 | 1 | 1 | 1 | 1 | 1 | 1 | 1 | 1 |
| Tin catalyst | 2 | 2 | 2 | 2 | 2 | 2 | 2 | 2 | 2 | 2 | 2 | 2 | 2 | 2 | 2 |
| Diamine compound (B1) | 2 | 2 | 2 | 2 | 2 | 2 | 2 | 2 | 2 | 2 | 2 | 2 | 2 | | |
| Diamine compound (B2) | | | | | | | | | | | | | | 2 | 2 |
| Diamine compound (C) Stain resistant agent A | 2 | | | | | | | | | 2 | | 1 | | 2 | 2 |
| Stain resistant agent B | | 2 | | | | | | | | | 2 | | | | |
| Stain resistant agent C | | | 2 | | | | | | | | | | | | |
| Stain resistant agent D | | | | 2 | | | | | | | | | | | |
| Stain resistant agent E | | | | | 2 | | | | | | | | | | |

TABLE 1-continued (No. 2)

| | Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Stain resistant agent F | | | | | | | 2 | | | | | | | | |
| Stain resistant agent G | | | | | | 2 | | | | | | | | | |
| Stain resistant agent H | | | | | | | | 2 | | | | | | | |
| Stain resistant agent I | | | | | | | | | 2 | | | 1 | 1 | | |
| Photopolymerization initiator (D1) | | | | | | | | | | 1 | 1 | | 1 | | 1 |
| Surface tackiness | ○ | ○ | ○ | ○ | ○ | ○ | ○ | ○ | ○ | ○ | ○ | ○ | ○ | ○ | ○ |
| Initial stain resistance | ○ | ○ | Δ | ○ | ○ | ○ | ○ | ○ | ○ | ○ | ○ | ○ | ○ | ○ | ○ |
| Post-heating stain resistance | ○ | ○ | ○ | ○ | Δ | ○ | ○ | Δ | Δ | ○ | ○ | ○ | ○ | ○ | ○ |
| Weather resistance | ○ | ○ | ○ | ○ | ○ | ○ | ○ | ○ | ○ | ○ | ○ | ○ | ○ | ○ | ○ |
| Bonding performance | ○ | Δ | Δ | Δ | ○ | ○ | Δ | ○ | Δ | ○ | ○ | Δ | Δ | ○ | ○ |

As the above-mentioned individual composition components, the following compounds were used:
(Meth)acrylic polymer (A1): SA310S (Kaneka Corp.),
Colloidal calcium carbonate: CALFINE 200M (manufactured by Maruo Calcium Co., Ltd.),
Ground calcium carbonate: LITON A-4 (manufactured by Bihoku Funka Kogyo Co., Ltd.),
Titanium oxide: R-820 (manufactured by Ishihara Sangyo Kaisha, Ltd.)
Plasticizer 1: acrylic oligomer (trade name: UP-1000, manufactured by Toagosei Co., Ltd.),
Plasticizer 2: polypropylene glycol (trade name: PREMINOL 4002, manufactured by Asahi Glass Co., Ltd.),
Dehydrating agent 1: vinyltrimethoxysilane (trade name: SILQUEST A-171, manufactured by Momentive Performance Materials Japan LLC.),
Dehydrating agent 2: N-β-aminoethyl-γ aminopropyltrimethoxysilane (trade name: SILQUEST A-1120, manufactured by Momentive Performance Materials Japan LLC.),
Tin catalyst: dibutyltin diacetylacetoante (trade name: NEOSTANN U-220, Nitto Kasei Co., Ltd.),
Stearylamine (manufactured by Tokyo Chemical Industry Co., Ltd.),
Diamine compound (B1): hardened beef tallow propylenediamine (trade name: ASPAHSOL #10, manufactured by NFO Corp.),
Diamine compound (B2): 1,12-dodecanediamine (manufactured by Tokyo Chemical Industry Co., Ltd.),
Known additive: reaction product yielded by mixing hardened beef tallow propylenediamine (trade name: ASPAHSOL #10, manufactured by NFO Corp.) and γ-glycidoxypropyltriethoxysilane (trade name: KBE 402, manufactured by Shin-Etsu Chemical Co., Ltd.), the amounts of which were moles equal to each other, with each other, and causing the components to each other at 50° C. for 12 hours,
Diamine compound (C): Stain resistant agent A (Synthesis Example 1),
Diamine compound (C): Stain resistant agent B (Synthesis Example 2),
Diamine compound (C): Stain resistant agent C (Synthesis Example 3),
Diamine compound (C): Stain resistant agent D (Synthesis Example 4),
Diamine compound (C): Stain resistant agent E (Synthesis Example 5),
Diamine compound (C): Stain resistant agent F (Synthesis Example 6),
Diamine compound (C): Stain resistant agent G (Synthesis Example 7),
Diamine compound (C): Stain resistant agent H (Synthesis Example 8),
Diamine compound (C): Stain resistant agent I (Synthesis Example 9), and
Photopolymerization initiator (D): IRGACURE 651 (MANUFACTURED BY Ciba Japan K.K.).

From results shown in Table 1, it has been understood that the curable resin compositions prepared in Comparative Examples 1 to 5, in each of which no diamine compound (C) used in the present invention was contained, were each poor in post-heating stain resistance. It has also been understood that according to the incorporation of the photopolymerization initiator, the composition (concerned) was improved in post-heating stain resistance but had surface tackiness to be poor in initial stain resistance.

By contrast, it has been understood that each of the curable resin compositions prepared in Examples 1 to 15, wherein any one of the diamine compounds (C) was contained, was excellent in weather resistance and bonding performance, had no surface tackiness after cured, and was able to keep a high stain resistance over a long term from an initial stage just after a process in which the composition was applied.

The invention claimed is:

1. A curable resin composition, comprising 100 parts by mass of a (meth)acrylic polymer (A) having, at a terminal thereof, at least one crosslinkable silyl group; 0.1 to 100 parts by mass of a diamine compound (B) having a monovalent or bivalent aliphatic or alicyclic hydrocarbon group that has 8 or more carbon atoms and may be branched and having at least one primary amino group; and 0.1 to 100 parts by mass of a diamine compound (C) having a monovalent aliphatic or alicyclic hydrocarbon group that has 8 or more carbon atoms and may be branched, and having a crosslinkable silyl group and/or a (meth)acryloyl group.

2. The curable resin composition according to claim 1, wherein the diamine compound (C) is a reaction product (C1) made from a diamine compound (c11) represented by the following formula (I), an epoxysilane (c12), and a (meth)acryloyl-group-containing compound (c13):

$$R^1\text{—NH—}R^2\text{—NH}_2 \quad (I)$$

wherein $R^1$ represents a monovalent aliphatic or alicyclic hydrocarbon group that has 8 or more carbon atoms and may be branched, and $R^2$ represents a bivalent hydrocarbon group that has 2 to 18 carbon atoms, may have an oxygen atom, and may be branched.

3. The curable resin composition according to claim 2, wherein the ratio by mole of the diamine compound (c11) to the epoxysilane (c12) to the (meth)acryloyl-group-containing compound (c13), i.e., the ratio by mole of (c11)/(c12)/

(c13), these compounds being used in the reaction product (C1), is from 1/0.1-3.0/0.1-3.0.

4. The curable resin composition according to claim 2, wherein the (meth)acryloyl-group-containing compound (c13) has a saturated hydrocarbon group.

5. The curable resin composition according to claim 2, wherein the (meth)acryloyl-group-containing compound (c13) has an unsaturated hydrocarbon group.

6. The curable resin composition according to claim 2, wherein the (meth)acryloyl-group-containing compound (c13) has a cyclic structure.

7. The curable resin composition according to claim 1, wherein the diamine compound (C) is a diamine compound (C2) represented by the following formula (II):

$$R^1—NR^3—R^2—NR^4R^5 \qquad (II)$$

wherein $R^1$ represents a monovalent aliphatic or alicyclic hydrocarbon group that has 8 or more carbon atoms and may be branched; $R^2$ represents a bivalent hydrocarbon group that has 2 to 18 carbon atoms, may have an oxygen atom, and may be branched; and $R^3$, $R^4$ and $R^5$ each independently represent a hydrogen atom, or an organic group that has 2 to 30 carbon atoms and may contain a (meth)acryloyl group provided that at least one of $R^3$, $R^4$ and $R^5$ represents a group containing a (meth)acryloyl group.

8. The curable resin composition according to claim 7, wherein the diamine compound (C2) is a reaction product made from a diamine compound (c21) represented by the following formula (I), and a compound (c22) having, in a single molecule thereof, two or more (meth)acryloyl groups:

$$R^1—NH—R^2—NH_2 \qquad (I)$$

wherein $R^1$ represents a monovalent aliphatic or alicyclic hydrocarbon group that has 8 or more carbon atoms and may be branched, and $R^2$ represents a bivalent hydrocarbon group that has 2 to 18 carbon atoms, may have an oxygen atom, and may be branched.

9. The curable resin composition according to claim 7, wherein the diamine compound (C2) is a reaction product made from a diamine compound (c21) represented by the following formula (I), and a compound (c23) having, in a single molecule thereof, one or more (meth)acryloyl groups, and one or more epoxy groups:

$$R^1—NH—R^2—NH_2 \qquad (I)$$

wherein $R^1$ represents a monovalent aliphatic or alicyclic hydrocarbon group that has 8 or more carbon atoms and may be branched, and $R^2$ represents a bivalent hydrocarbon group that has 2 to 18 carbon atoms, may have an oxygen atom, and may be branched.

10. The curable resin composition according to claim 7, wherein the diamine compound (C2) contains a crosslinkable silyl group.

11. The curable resin composition according to claim 1, further comprising a photopolymerization initiator (D).

12. The curable resin composition according to claim 11, wherein the photopolymerization initiator (D) is a radical photoinitiator.

\* \* \* \* \*